United States Patent
Oba (10) Patent No.: US 10,826,081 B2
(45) Date of Patent: Nov. 3, 2020

(54) METHOD FOR CONVEYING FUEL CELL SEPARATOR MATERIAL

(71) Applicant: TOYOTA JIDOSHA KABUSHIKI KAISHA, Toyota-shi, Aichi (JP)

(72) Inventor: Yusuke Oba, Anjyo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/376,240

(22) Filed: Apr. 5, 2019

(65) Prior Publication Data

US 2019/0326612 A1 Oct. 24, 2019

(30) Foreign Application Priority Data

Apr. 19, 2018 (JP) .................................. 2018-080926

(51) Int. Cl.
*H01M 8/00* (2016.01)
*H01M 8/0234* (2016.01)
*H01M 8/0232* (2016.01)

(52) U.S. Cl.
CPC ....... *H01M 8/0234* (2013.01); *H01M 8/0232* (2013.01)

(58) Field of Classification Search
CPC .......................... H01M 8/0234; H01M 8/0232
See application file for complete search history.

(56) References Cited

U.S. PATENT DOCUMENTS

2016/0079611 A1* 3/2016 Numao ............... H01M 8/2457
429/535

FOREIGN PATENT DOCUMENTS

JP 2015-118810 A 6/2015

* cited by examiner

*Primary Examiner* — Jane J Rhee
(74) *Attorney, Agent, or Firm* — Dickinson Wright, PLLC (57) ABSTRACT

Provided is a method for conveying a separator that ensures stably conveying a separator material without leaving an indentation or the like. The conveyance method conveys a separator material for use in a single cell of a fuel cell. A hydrogen gas and an air are supplied for the fuel cell to generate electricity. The separator material has a rectangular shape in a plan view of the separator material, and the separator material has both sides on which a pair of through-holes are formed at proximity of a pair of hydrogen distribution ports through which a hydrogen gas flows. The conveyance method includes, when the separator material is conveyed, inserting a conveyance pin into each of the through-holes formed on the separator material, and in a state where the conveyance pin is inserted in each of the through-holes, conveying the separator material while pulling the separator material in a direction in which the conveyance pins mutually separate.

2 Claims, 10 Drawing Sheets

METHOD FOR CONVEYING FUEL CELL SEPARATOR MATERIAL

CROSS REFERENCE TO RELATED APPLICATIONS

The present application claims priority from Japanese patent application JP 2018-080926 filed on Apr. 19, 2018, the content of which is hereby incorporated by reference into this application.

BACKGROUND

Technical Field

The present disclosure relates to a method for conveying a fuel cell separator material.

Background Art

Conventionally, a fuel cell is configured by stacking a plurality of single cells. Each of the single cells has a structure in which a membrane electrode assembly is interposed between separators. The membrane electrode assembly includes a solid polymer electrolyte membrane (hereinafter referred to as "electrolyte membrane") and an anode side catalyst layer (anode electrode) and a cathode side catalyst layer (cathode electrode) joined on both surfaces of the electrolyte membrane. On surfaces of the anode side catalyst layer and the cathode side catalyst layer, gas diffusion layers are formed as necessary. A pair of the separators between which the membrane electrode assembly is interposed supply a hydrogen gas and an air to the membrane electrode assembly, and include a distribution port and a flow passage to discharge the supplied hydrogen gas and air.

Such a separator is molded into a separator material from, for example, a thin plate material made of metal before being installed onto a single cell of a fuel cell. For example, by a plurality of pressworks, the separator material is molded while being sequentially conveyed. After the molded separator materials are conveyed to the membrane electrode assembly, the membrane electrode assembly is interposed between the conveyed separator materials.

As a method for conveying such a separator material, for example, in JP 2015-118810 A, there is proposed a method for conveying the separator material. The method sandwiches both sides of the separator material from an upper side and a lower side with gripping members and pulls the separator material with the gripping members in the direction in which the gripping members on both sides separate.

SUMMARY

However, while the separator material is gripped and conveyed in the conveyance method described in JP 2015-118810 A, a grippable area of the separator material is small due to a structure of the separator material, and therefore, the separator material cannot be stably held sometimes. As a result, for example, a vibration during the conveyance causes the separator material to slip with respect to the gripping members, and thus, there has been a possibility that the separator material drops.

From this point of view, in order to avoid the gripping members from slipping with respect to the separator material, it is only necessary to increase a gripping force of the gripping members onto the separator material. In this case, the separator material might get an indentation from the gripping members.

The present disclosure has been made in view of such an aspect, and the present disclosure provides a method for conveying a separator that ensures stably conveying a separator material without leaving an indentation or the like.

In view of the above-described problem, a method for manufacturing a separator material according to the disclosure is a conveyance method for conveying a separator material for use in a single cell of a fuel cell. A hydrogen gas and an air are supplied for the fuel cell to generate electricity. The separator material has a rectangular shape in a plan view of the separator material. The separator material has both sides on which a pair of through-holes are formed at proximity of a pair of hydrogen distribution ports through which a hydrogen gas flows. The conveyance method includes, when the separator material is conveyed, inserting a conveyance pin into each of the through-holes formed on the separator material, and in a state where the conveyance pin is inserted in each of the through-holes, conveying the separator material while pulling the separator material in a direction in which the conveyance pins mutually separate.

Here, the "separator material" in the present disclosure includes both cases of a material before molding and in the middle of molding into a shape of the separator, and a member after molding before being incorporated in a part of a cell after molding. Accordingly, when the "separator material" is the material, a material on which the hydrogen distribution port is not formed is also included. In such a case, the separator material has a through-hole formed at proximity of a part where the hydrogen distribution port is to be formed. Meanwhile, when the "separator material" is the member after molding, the separator material includes the hydrogen distribution port, and the through-hole is formed at proximity of the hydrogen distribution port.

With the present disclosure, in the state where the conveyance pin is inserted in each of the through-holes formed on both sides of the separator material, the separator material is pulled in the direction in which the conveyance pins mutually separate to convey the separator material. This ensures conveying the separator material while the separator material is held in a stable state with a pair of the conveyance pins. Since the separator material is conveyed by inserting the conveyance pin into the through-hole of the separator material without interposing the separator material between, for example, gripping members, the separator material does not get an indentation or the like.

Furthermore, since the hydrogen distribution port through which the hydrogen gas flows is small compared with the distribution port through which the air and the like flows, a peripheral area of the hydrogen distribution port has an excess space for forming the through-hole. With the present disclosure, since the separator material is conveyed using the through-hole formed in such an excess space, it is not necessary to increase a size of the separator material to be larger than a conventional one.

In some embodiments, the through-hole is a reference hole for assembly when the plurality of single cells are assembled. With this aspect, since the reference hole for assembly when the plurality of single cells are assembled can be used as the through-hole for conveyance, it is not necessary to additionally provide the through-hole for conveyance, and thus, the productivity of the separator material does not deteriorate.

The present disclosure ensures conveying the separator material in a stable posture without leaving, an indentation or the like.

DETAILED DESCRIPTION

The following describes one embodiment of a method for molding including a method for conveying a fuel cell separator material according to the present disclosure in details based on the drawings.

1. Fuel Cell

Figure 1:
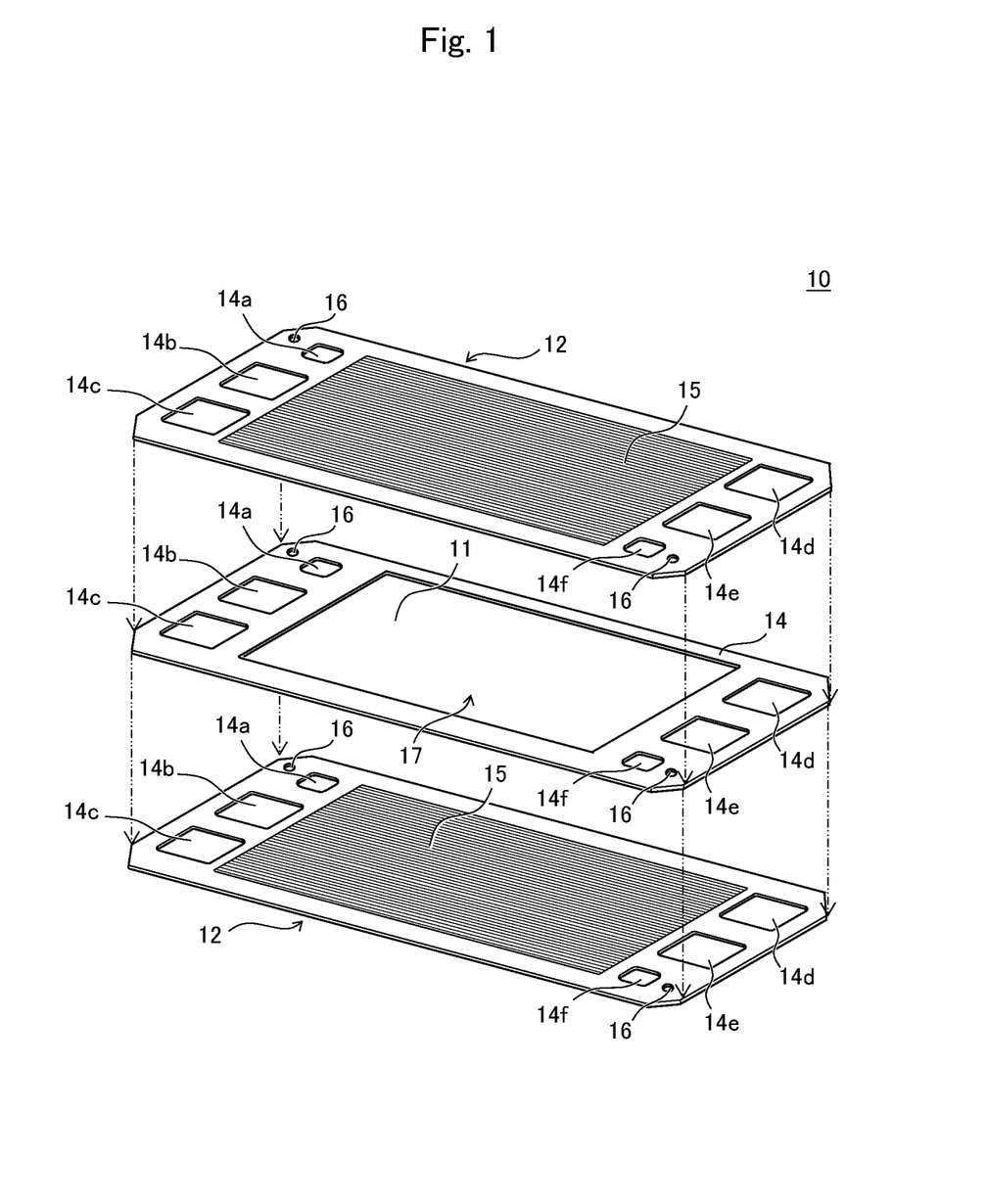
FIG. 1 is an exploded perspective view of a single cell of a fuel cell that uses a separator material conveyed in an embodiment of the present disclosure.
Figure 2:
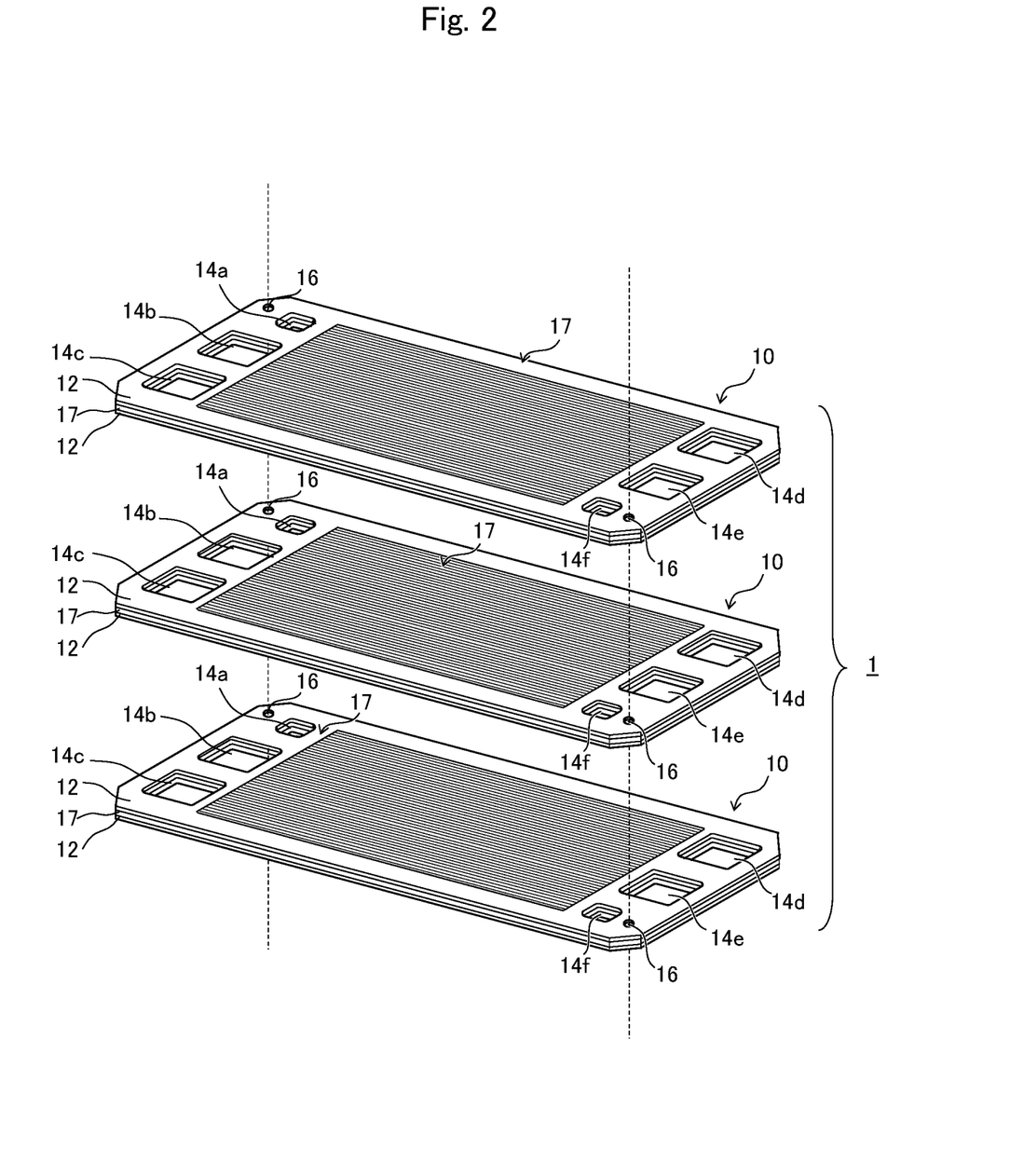
FIG. 2 is a perspective view illustrating a process of forming a fuel cell by stacking the single cell illustrated in FIG. 1.
Figure 3:
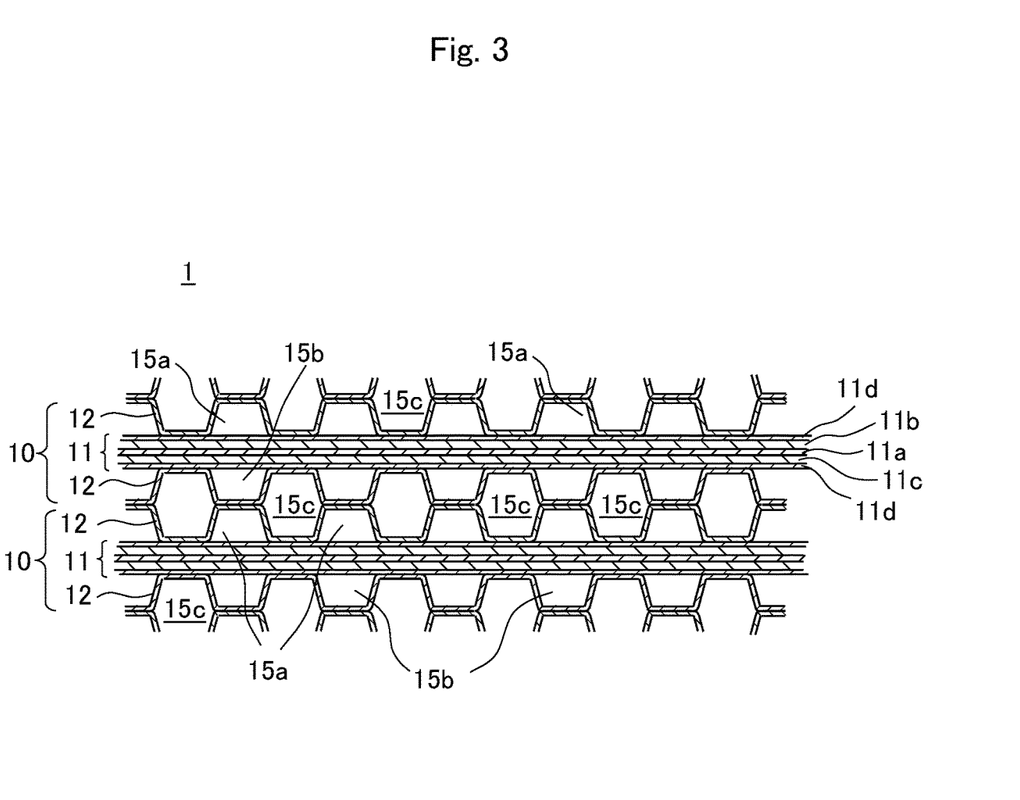
FIG. 3 is a main part cross-sectional view illustrating flow passages through which a hydrogen gas, an air, and a cooling water for the fuel cell illustrated in FIG. 2 flow.

First, with reference to FIG. 1 to FIG. 3, a fuel cell and a single cell that use separator materials conveyed by a conveyance method according to one embodiment of the present disclosure are described. FIG. 1 is an exploded perspective view of a single cell of a fuel cell using separator materials conveyed in an embodiment of the present disclosure. FIG. 2 is a perspective view illustrating a process to stack the single cells illustrated in FIG. 1 to form a fuel cell. FIG. 3 is a main part cross-sectional view illustrating flow passages through which a hydrogen gas, an air, and cooling water for the fuel cell illustrated in FIG. 2 flow.

In this description, a "separator" indicates a state of being embedded in a single cell as illustrated in FIG. 1 to FIG. 3, and a "separator material" indicates one before being molded into a shape of a separator, one in the middle of the molding, and one after being molded before being embedded into the single cell as illustrated in FIG. 4 to FIG. 10.

In a fuel cell 1 according to this embodiment, a plurality of single cells 10 are stacked. The single cell 10 is a basic unit. The single cell 10 is a solid polymer fuel cell that generates an electromotive force through an electrochemical reaction between an oxygen gas contained in an air and a hydrogen gas as a fuel gas. The air means an atmosphere. For example, the air compressed by a compressor is supplied to the fuel cell 1, and the hydrogen gas filled in a high pressure tank is supplied to the fuel cell.

As illustrated in FIG. 1 to FIG. 3, the single cell 10 that constitutes the fuel cell 1 includes an electric generation assembly 17 and a pair of separators 12, 12 that sandwich the electric generation assembly 17. The electric generation assembly 17 includes a Membrane Electrode & Gas Diffusion Layer Assembly (MEGA) 11 and a resin frame 14 that surrounds an outer periphery of the MEGA 11.

As illustrated in FIG. 3, the MEGA 11 includes a polymer electrolyte membrane 11a, catalyst layers 11b, 11c joined on both surfaces of the polymer electrolyte membrane 11a, and gas diffusion layers 11d, 11d joined on the catalyst layers 11b, 11c. A part where the MEGA 11 is disposed is an electric generation region of the single cell 10.

The polymer electrolyte membrane 11a is made of a proton-conductive ion exchange membrane formed of a solid polymer material. The catalyst layers 11b, 11c are formed of, for example, a porous carbon material that supports a catalyst, such as platinum. The catalyst layer 11b disposed on one side of the polymer electrolyte membrane 11a becomes an anode of the fuel cell 1, and the catalyst layer 11c on the other side becomes a cathode of the fuel cell 1. The gas diffusion layer 11d is formed of a carbon porous body, such as a carbon paper or a carbon cloth, or a conductive member having gas permeability, such as a metal porous body, such as a metal mesh or porosity metal.

The resin frame 14 has both sides in the longitudinal direction on which six manifold openings (distribution ports) are formed in order to individually supply the hydrogen gas, the air, and the cooling water to the MEGA 11 or the proximity of the MEGA 11 and discharge the supplied hydrogen gas, air, and cooling water from the MEGA 11 or the proximity of the MEGA 11.

Specifically, one side of the resin frame 14 includes a hydrogen distribution port 14a through which the hydrogen gas flows, a cooling water distribution port 14b through which the cooling water flows, and an air distribution port 14c through which the air flows in this order. The other side of the resin frame 14 includes an air distribution port 14d through which the air flows, a cooling water distribution port 14e through which the cooling water flows, and a hydrogen distribution port 14f through which the hydrogen gas flows in this order.

The pairs of manifold openings (distribution ports) through which the respective fluids flow have ones that serve as supply distribution ports for the MEGA 11 or the proximity of the MEGA 11 and the others that serve as discharge distribution ports from the MEGA 11 or the proximity of the MEGA 11. For example, the one hydrogen distribution port 14a serves as a supply distribution port for the MEGA 11, and the other hydrogen distribution port 14f serves as a discharge distribution port from the MEGA 11. Since the hydrogen distribution port 14a and the hydrogen distribution port 14f are diagonally provided on the resin frame 14, the hydrogen gas can be diagonally distributed in the electric generation region.

Furthermore, the resin frame 14 has a pair of through-holes 16, 16 formed at the proximity of the pair of hydrogen distribution ports 14a, 14f through which the hydrogen gas flows. Specifically, the respective through-holes 16 are formed at an outer peripheral side with respect to the hydrogen distribution port 14a (14f) on the resin frame 14.

The separator 12 has a rectangular shape in a plan view and is a member molded of a thin plate material or a foil material made of metal, such as stainless steel, titanium, and titanium alloy. The separator 12 has a thickness of, for example, 10 μm to 200 μm. The thin plate material or the foil material as the material of the separator 12 is formed by, for example, cold rolling. The separator 12 is molded into a predetermined shape by press forming from the above-described thin plate material or the foil material. Furthermore, this press formed thing may be used as a substrate of the separator 12, and this surface may further include, for example, a carbon film. The carbon film may be formed before the separator 12 is molded by pressing or may be formed after the separator 12 is molded by pressing.

The separator 12 is formed into a rectangular shape identical to the shape of the MEGA 11 in a plan view, and has both sides in the longitudinal direction on which six manifold openings (distribution ports) are formed similarly to the MEGA 11. A part of the separator 12 in contact with the MEGA 11 has a multiple grooves 15 formed along, for example, the longitudinal direction. Accordingly, as illustrated in FIG. 3, the flow passages through which the fuel gas, the air, and the cooling water flow are formed.

Specifically, the flow passages defined between the gas diffusion layer 11d on the side of the one catalyst layer 11b and the separator 12 are flow passages 15a through which the hydrogen gas flows. The flow passages defined between the gas diffusion layer 11d on the side of the other catalyst layer 11c and the separator 12 are flow passages 15b through which the air flows. The flow passages formed between the separators 12 are flow passages 15c through which the cooling water flows. In this embodiment, when the hydrogen gas is supplied to the flow passages 15a on one side and the air is supplied to the flow passages 15b on the other side, an electrochemical reaction occurs to generate the electromotive force within the single cell 10.

Furthermore, both sides in the longitudinal direction of the separator 12 include the six manifold openings (distribution ports) in order to individually supply the hydrogen gas, the air, and the cooling water to the MEGA 11 or the proximity of the MEGA 11 and discharge the supplied hydrogen gas, air, and cooling water from the MEGA 11 or the proximity of the MEGA 11. These distribution ports are formed at positions corresponding to the distribution ports of the resin frame 14 and formed into the sizes identical to the respective distribution ports that correspond. In FIG. 1, the distribution ports of the separator 12 that correspond to the distribution ports of the resin frame 14 are attached with reference numerals identical to the distribution ports of the resin frame 14.

Specifically, the separator 12 has one side on which the hydrogen distribution port 14a through which the hydrogen gas flows, the cooling water distribution port 14b through which the cooling water flows, and the air distribution port 14c through which the air flows are formed in this order. The separator 12 has the other side on which the air distribution port 14d through which the air flows, the cooling water distribution port 14e through which the cooling water flows, and the hydrogen distribution port 14f through which the hydrogen gas flows are formed in this order.

The manifold openings (distribution ports) through which the respective fluids flow have ones that serve as supply distribution ports to the MEGA 11 or the proximity of the MEGA 11 and the others that serve as discharge distribution ports from the MEGA 11 or the proximity of the MEGA 11. For example, the one hydrogen distribution port 14a serves as the supply distribution port for the MEGA 11, and the other hydrogen distribution port 14f serves as the discharge distribution port from the MEGA 11. Since the hydrogen distribution port 14a and the hydrogen distribution port 14f are diagonally provided on the separator 12, the hydrogen gas can be diagonally distributed in the MEGA 11.

Furthermore, the separator 12 has the pair of through-holes 16, 16 at the proximity of the pair of hydrogen distribution ports 14a, 14f through which the hydrogen gas flows. Specifically, the respective through-holes 16 are formed at the outer peripheral side with respect to the hydrogen distribution port 14a (14f) on the separator 12.

Each of the through-holes 16 of the separator 12 and each of the through-holes 16 of the resin frame 14 serve as a reference hole for manufacture of the single cell 10. That is, as illustrated in FIG. 1, interposing the MEGA 11 and the resin frame 14 between the pair of the separators 12, 12 such that these through-holes 16, 16 match ensures disposing the pair of separators 12, 12 at an accurate position with respect to the MEGA 11 and the resin frame 14.

Furthermore, as illustrated in FIG. 2, when a plurality of the single cells 10, 10, . . . are assembled (stacked) such that they are stacked, the through-holes 16 serve as the reference holes for assembling the single cells 10. That is, each of the single cells 10 is stacked such that the through-holes 16 formed on each of the single cells 10 match (that is, such that the through-hole 16 formed on each of the single cells 10 form one communicated through-hole). This ensures stacking each of the single cells 10 on an accurate position.

2. Molding Apparatus for Separator Material

Figure 4:
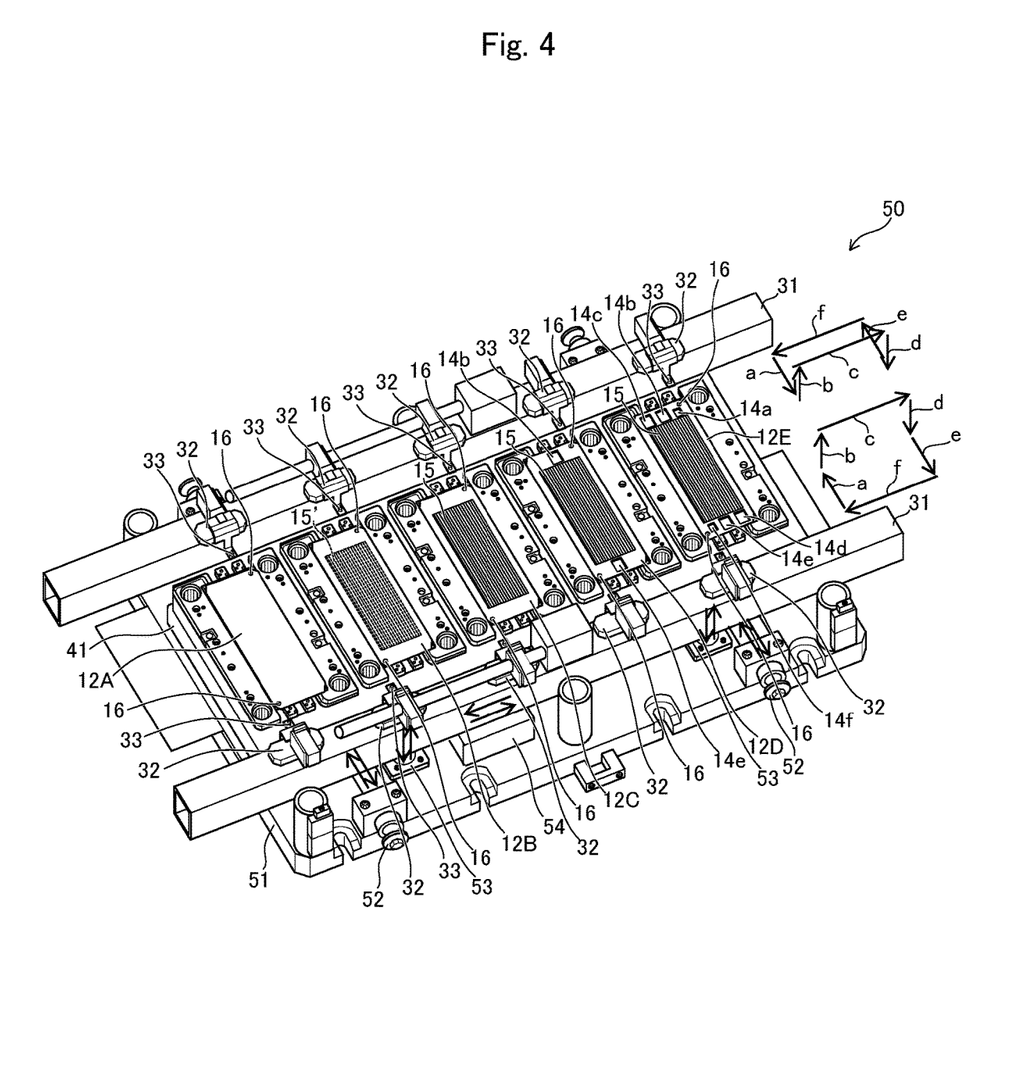
FIG. 4 is a schematic perspective view of a molding apparatus that molds a separator material while conveying the separator material.
Figure 5:
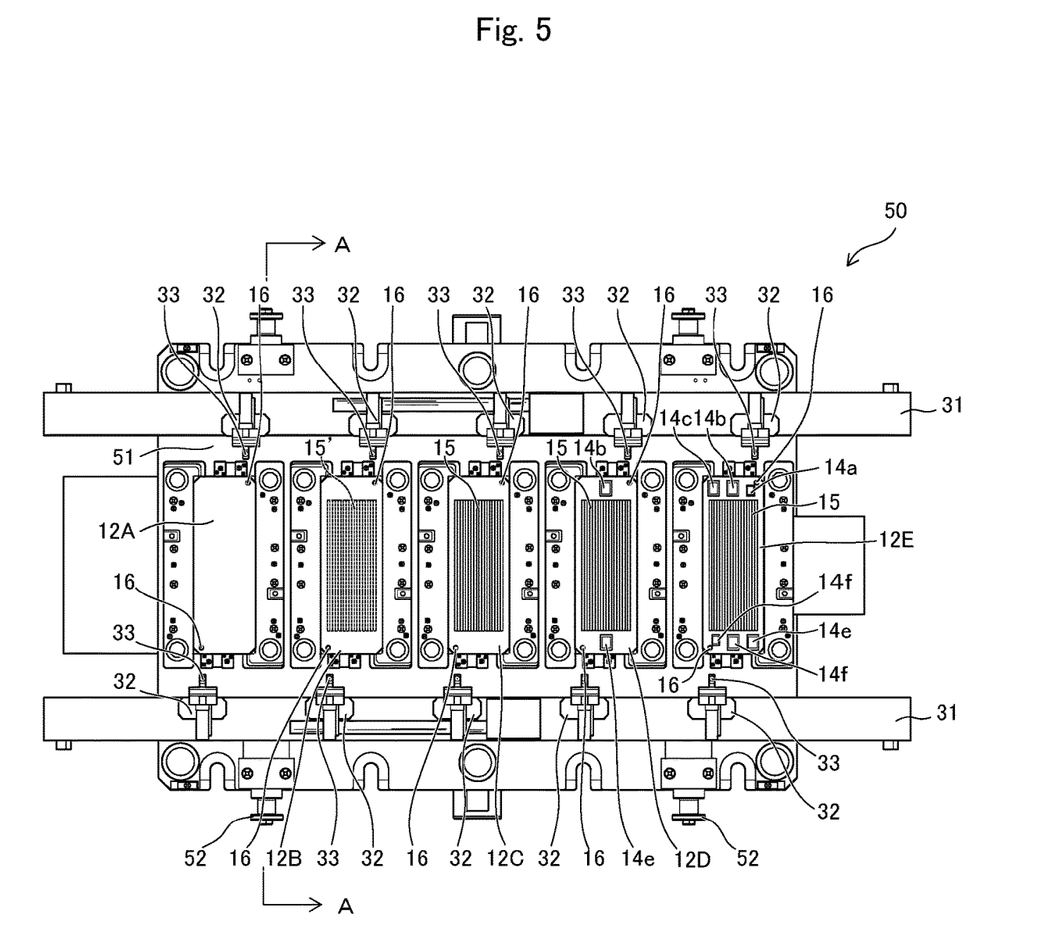
FIG. 5 is a schematic plan view of the molding apparatus illustrated in FIG. 4.
Figure 6:
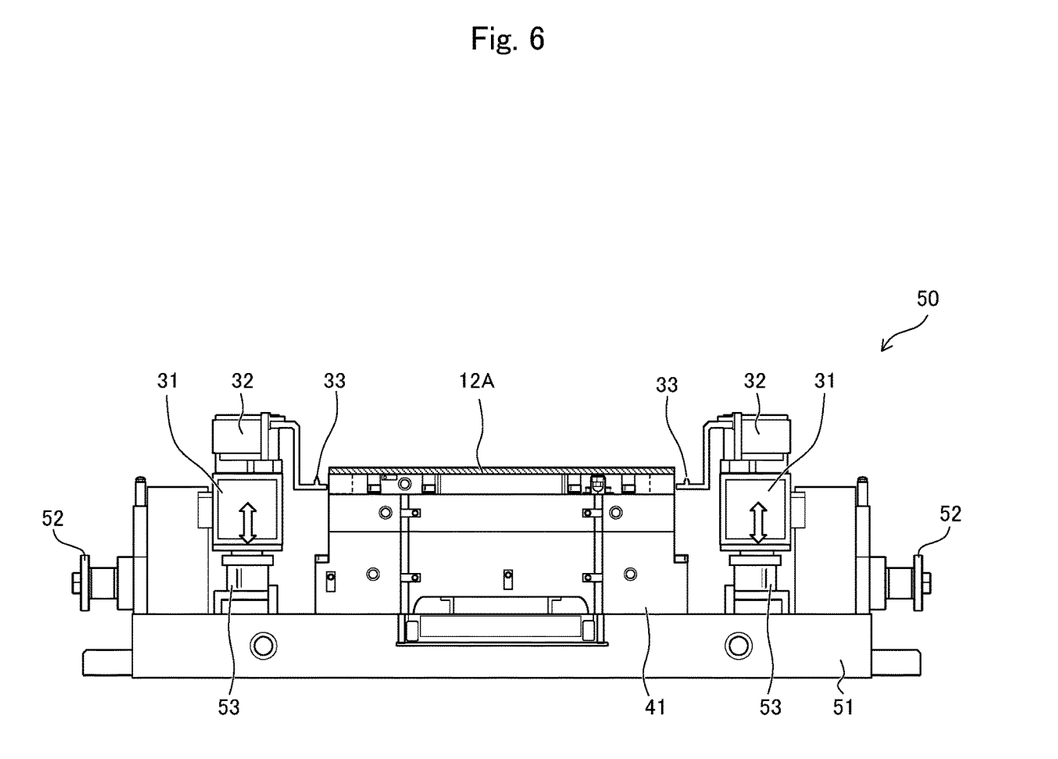
FIG. 6 is a front view of the molding apparatus illustrated in FIG. 5.
Figure 7:
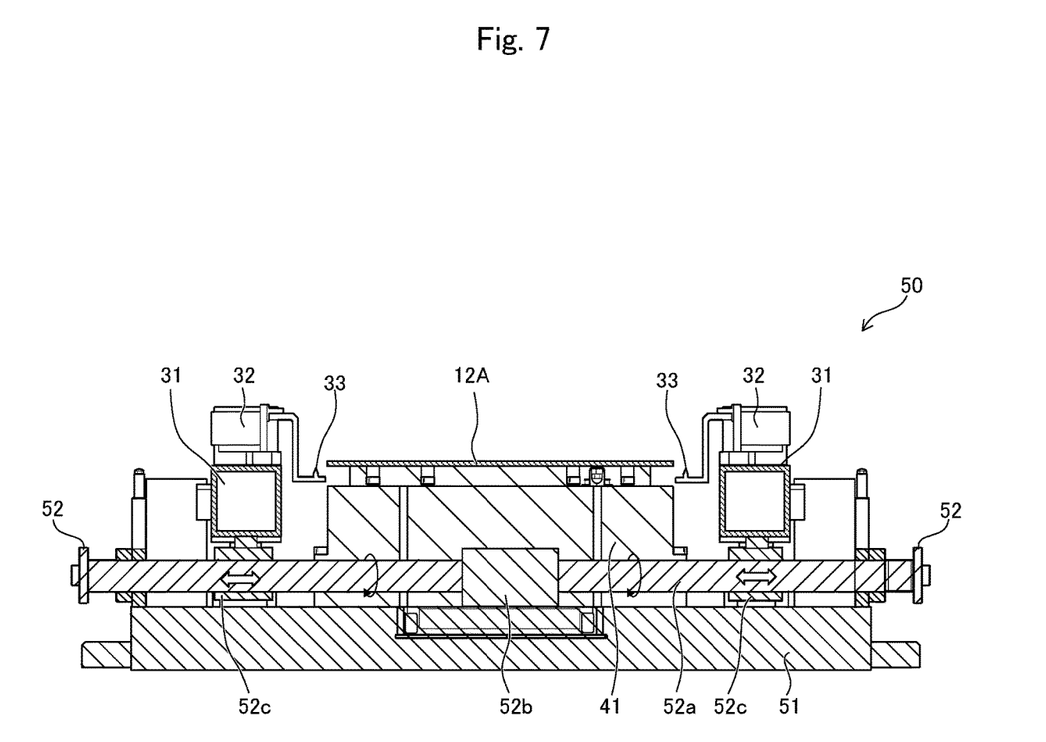
FIG. 7 is a cross-sectional view in the arrow direction along the line A-A of the molding apparatus illustrated in FIG. 5.

In this description, the one in the state of being disposed on the single cell 10 is referred to as the separator 12, and the one in the state therebefore (one including member before molding) is referred to as separator materials 12A to 12E. The following describes a molding apparatus 50 for the separator materials 12A to 12E with reference to FIG. 4 to FIG. 7. FIG. 4 is a schematic perspective view of the molding apparatus 50. FIG. 5 is a schematic plan view of the molding apparatus 50 illustrated in FIG. 4. FIG. 6 is a front view of the molding apparatus 50 illustrated in FIG. 5. FIG. 7 is a cross-sectional view in the arrow direction along the line A-A of the molding apparatus 50 illustrated in FIG. 5.

As illustrated in FIG. 4, the molding apparatus 50 includes a lower die 41 for molding into the separator materials 12A to 12E and an upper die (not illustrated). The press forming (including, for example, trimming) is performed by the upper die while the separator materials 12A to 12E placed on the lower die 41 are sequentially conveyed, and thus, the separator materials 12A to 12E are molded. The lower die 41 is secured on a base 51 and has a shape corresponding to shapes of the separator materials 12A to 12E, which will be described later, together with the upper die.

Here, the separator material 12A illustrated in FIG. 4 and FIG. 5 is a separator that has been trimmed at four corners of a rectangular-shaped thin plate material or foil material. The separator material 12B is a separator that is formed by performing a primary press forming of a multiple grooves 15' to the separator material 12A after the trimming. The separator material 12C is a separator on which the grooves 15 are molded by further performing a secondary press forming to the separator material 12B after the primary molding.

The separator material 12D is a separator formed by performing a trimming of a part (not illustrated) of an outer periphery of the separator material 12C to the separator material 12C after the secondary press forming, and further performing a punch forming of the cooling water distribution ports 14b, 14e. Furthermore, the separator material 12E is a separator formed by performing a trimming of a part (not illustrated) of an outer periphery of the separator material 12D to the separator material 12D after the cooling water distribution ports 14b, 14e are molded, and further performing a punch forming of the hydrogen distribution port 14a, 14f and the air distribution port 14c, 14d.

The above-described molding with respect to the separator materials 12A to 12E is achieved by pushing the upper die (not illustrated) into the lower die 41 after sequentially conveying them to predetermined positions of the lower die 41. The following describes members to convey the separator materials 12A to 12E in the molding apparatus 50.

In this embodiment, the molding apparatus 50 includes a pair of feed bars 31, 31 on both sides of the lower die 41. Each of the feed bars 31 includes five holders 32, 32, . . . . The holders 32 are portions to hold the respective separator materials 12A, 12B, . . . to be conveyed. The holders 32 each have a distal end on which a conveyance pin 33 is disposed.

Figure 10:
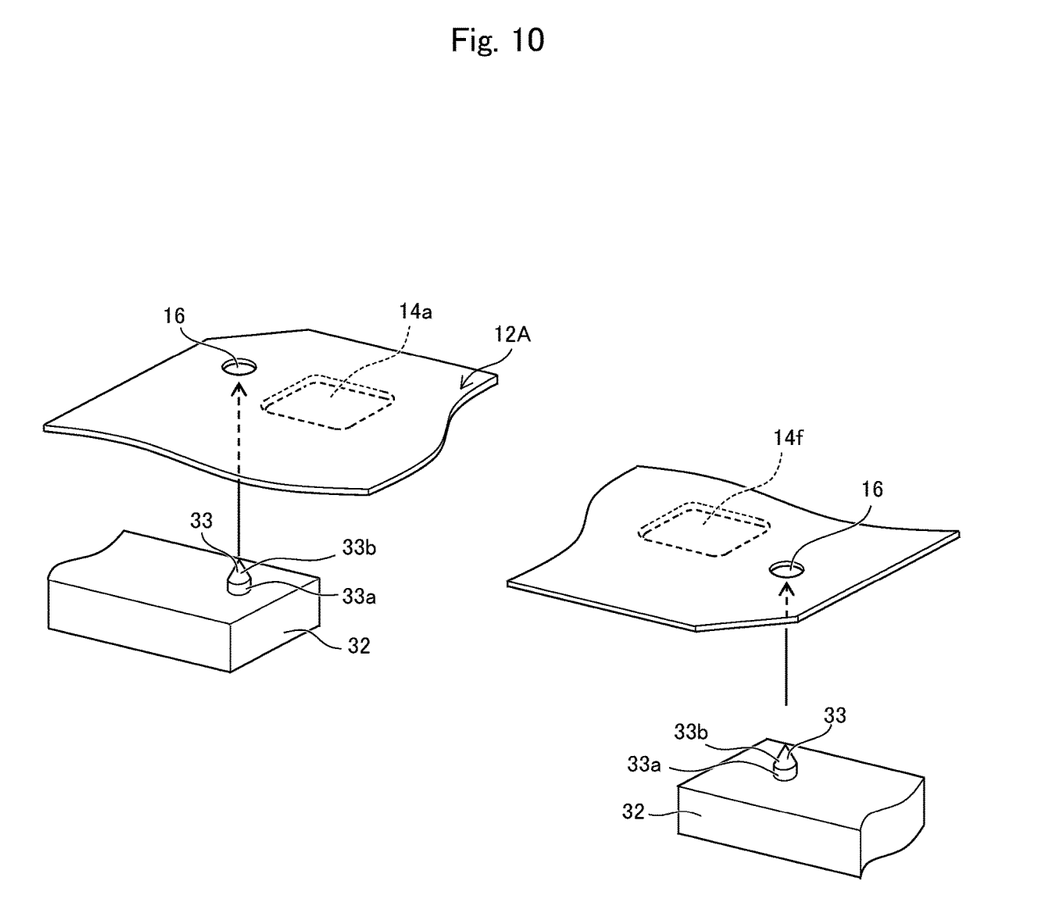
FIG. 10 is a main part perspective view to describe the elevating step and the holding step illustrated in FIG. 9.

The conveyance pin 33 has a size that can be inserted into the through-holes 16 formed on the respective separator materials 12A, 12B, . . . . Specifically, as illustrated in FIG. 10, the conveyance pin 33 includes a cylindrical portion 33a and a conical portion 33b. The cylindrical portion 33a has a diameter smaller than those of the through-holes 16 formed on the separator materials 12A, 12B, . . . . The conical portion 33b projects from the cylindrical portion 33a. The conveyance pin 33 is inserted into the through-hole 16 from a distal end side of the conical portion 33b.

Furthermore, as illustrated in FIG. 4, a first moving device 52 that brings the pair of feed bars 31, 31 close or away is disposed under each of the feed bars 31. Specifically, as illustrated in FIG. 7, the first moving device 52 includes a shaft 52a, a motor 52b, and movable parts 52c. The shaft 52a has screw grooves. The motor 52b rotates the shaft 52a. The movable parts 52c are screwed to the shaft 52a via balls and mounted on the feed bars 31 on both sides of the shaft 52a. Such a mechanism is a mechanism typically known as, for example, a ball screw mechanism. In this embodiment, the screw groove at a portion of the shaft 52a on one side with respect to the motor 52b is formed in the opposite direction of the screw groove at a portion of the shaft 52a on the other side with respect to the motor 52b.

This turns the shaft 52a in a normal rotation or a reverse rotation by the driving of the motor 52b and ensures a pair of the movable parts 52c, 52c screwed to the shaft 52a moving with the pair of the feed bars 31, 31 so as to come close or separate away. Thus, controlling the rotation direction and the rotation number of the motor 52b ensures the pair of feed bars 31, 31 executing these movements of approach a or separation e up to predetermined positions as illustrated in FIG. 4. While in this embodiment, the ball screw mechanism executes the movements of approach a or separation e of the pair of feed bars 31, 31, for example, a piston and a cylinder may execute these movements.

As illustrated in FIG. 4 and FIG. 6, a second moving device 53 that moves up or down the pair of feed bars 31, 31 is disposed under each of the feed bars 31. In FIG. 6, a part of the first moving device 52 is omitted. A mechanism of the second moving device 53 is not particularly limited as long as the feed bars 31 can be moved in the up and down direction. For example, a cam and a motor that rotates the cam or a piston and a cylinder can be employed. Accordingly, as illustrated in FIG. 4, movements of an elevation b or descent d of the pair of feed bars 31, 31 can be performed.

Furthermore, as illustrated in FIG. 4, a third moving device 54 that moves the pair of feed bars 31, 31 forward or backward is disposed under each of the feed bars 31. The third moving device 54 is configured of a ball screw mechanism (not illustrated) similarly to the first moving device 52 and a motor (not illustrated) coupled to the ball screw mechanism. Normal rotation and reverse rotation of the motor causes the ball screw mechanism to operate. This ensures executing movements of advance c or retreat f of the pair of feed bars 31, 31 as illustrated in FIG. 4.

3. Method for Conveying and Molding Separator Materials

Figure 8:
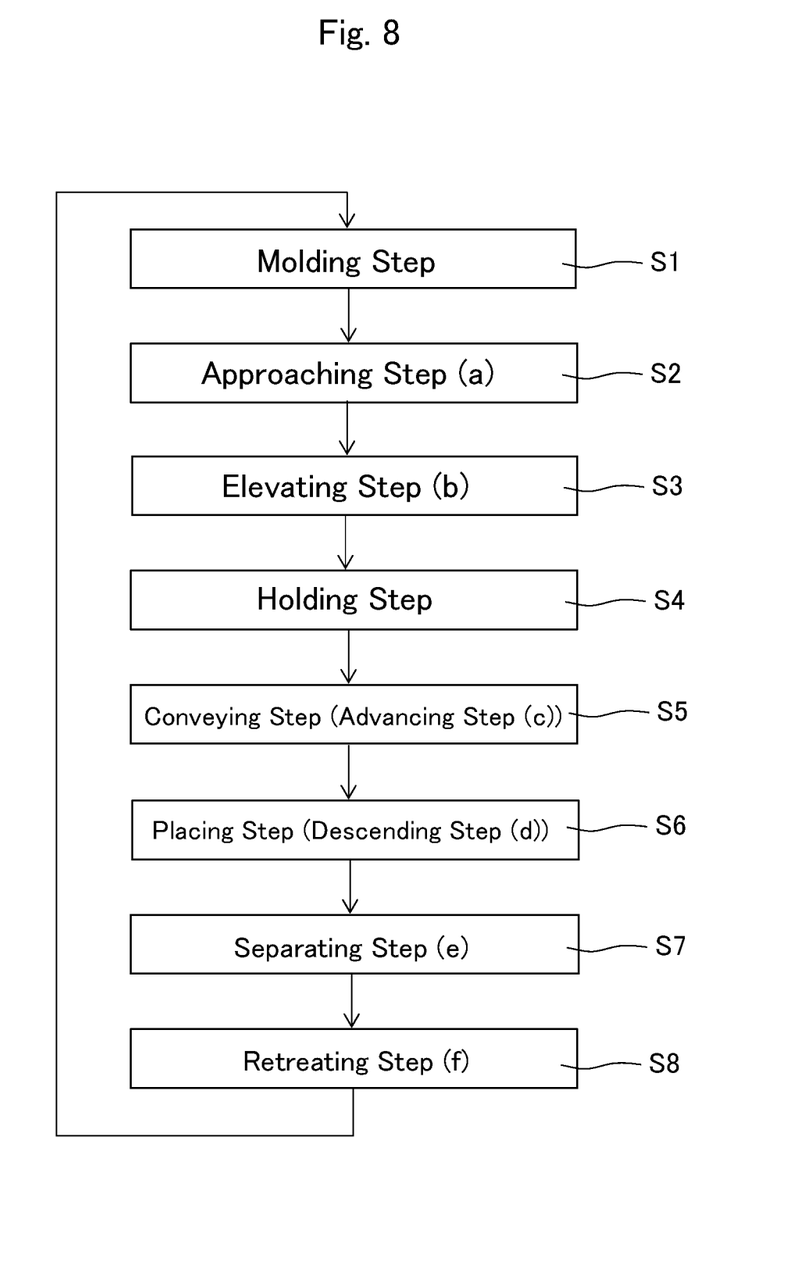
FIG. 8 is a flowchart to describe conveying and molding of the separator material in the molding apparatus illustrated in FIG. 5.
Figure 9:
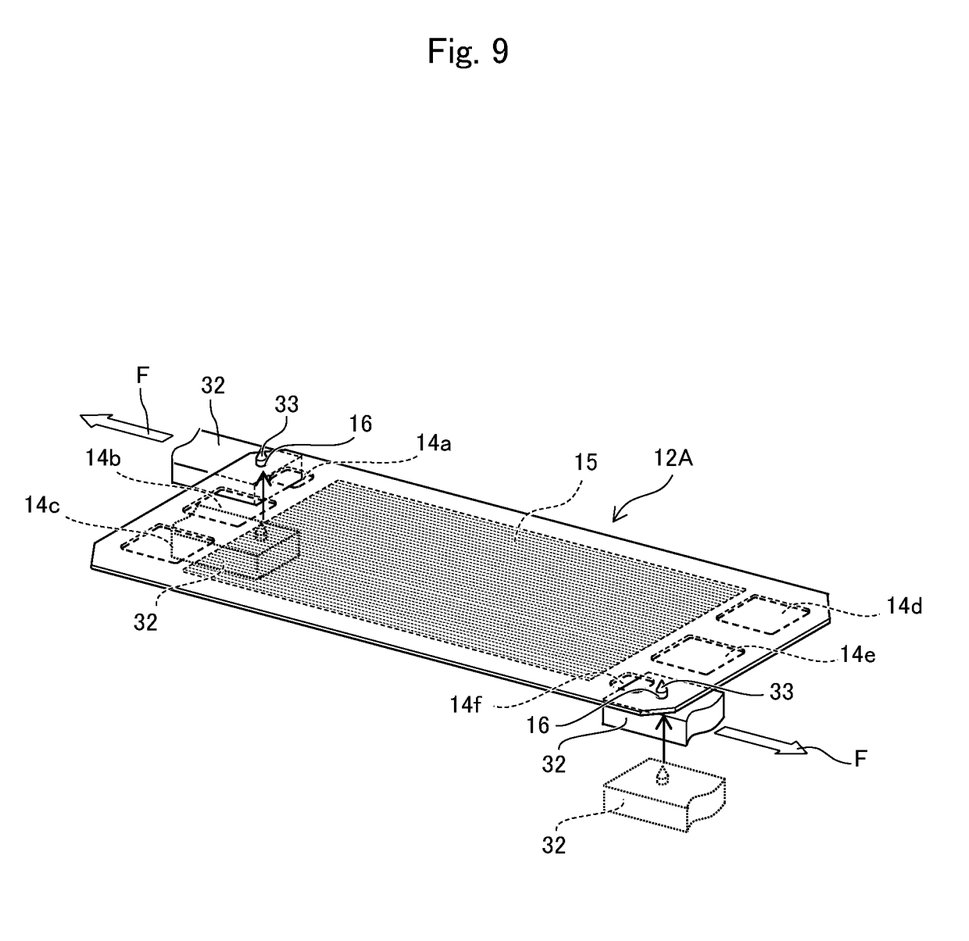
FIG. 9 is a perspective view to describe an elevating step and a holding step illustrated in FIG. 8.

The following describes a method for conveying and molding the separator materials 12A to 12E with reference to FIG. 8 to FIG. 10. FIG. 8 is a flowchart to describe conveying and molding of the separator materials 12A to 12E in the molding apparatus 50 illustrated in FIG. 5. FIG. 9 is a perspective view to describe an elevating step and a holding step illustrated in FIG. 8. FIG. 10 is its main part perspective view. In FIG. 9 and FIG. 10, positions of the distribution ports, groove portions, and the like that are molded afterwards on the separator material 12A are indicated with dashed lines.

Here, the separator material 12A will be described as one of its example. First, a molding step S1 is performed. In the molding step S1, the four corners of the rectangular-shaped foil material placed on the lower die 41 are trimmed to form the separator material 12A.

Next, the procedure proceeds to an approaching step S2. The first moving device 52 causes the pair of feed bars 31, 31 to come close (see approach a in FIG. 4). Accordingly, as illustrated in FIG. 10, the holders 32, 32 are disposed under the hydrogen distribution ports 14a, 14f of the separator material 12A, and the conveyance pins 33, 33 are disposed immediately under the through-holes 16, 16.

Next, the procedure proceeds to an elevating step S3. The second moving device 53 moves the pair of feed bars 31, 31 upward (see elevation b in FIG. 4). Accordingly, as illustrated in FIG. 9, the conveyance pins 33 are inserted into the respective through-holes 16 formed on the separator material 12A, and the separator material 12A is supported by a pair of the holders 32, 32.

Next, the procedure proceeds to a holding step S4. In the state where the conveyance pins 33 are inserted in the respective through-holes 16, the first moving device 52 pulls the separator material 12A in the direction in which the conveyance pins 33, 33 mutually separate. This brings the cylindrical portions 33a of the conveyance pins 33, 33 into contact with peripheral edges of the through-holes 16. The separator material 12A is pulled outward by a tensile force F. The separator material 12A is held with the conveyance pins 33, 33 inserted in both sides of the separator material 12A.

Next, the procedure proceeds to a conveying step (advancing step) S5. The third moving device 54 moves the pair of feed bars 31, 31 forward (see advance c in FIG. 4). Specifically, while the separator material 12A is pulled in the direction in which the conveyance pins 33, 33 mutually separate, the third moving device 54 conveys the separator material 12A to an upper side of the next pressing position.

Next, the procedure proceeds to a placing step (descending step) S6. The first moving device 52 releases pulling of the separator material 12A, and the second moving device 53 moves down the pair of feed bars 31, 31 (see descent d in FIG. 4). This places the separator material 12A in the lower die 41 and disposes the separator material 12A in the next pressing position, and the conveyance pins 33 inserted in the respective through-holes 16 exit out of the through-holes 16.

While in this embodiment, the pulling that acts on the separator material 12A is released before the separator material 12A is moved down, for example, the pulling that acts on the separator material 12A may be released at a timing when the separator material 12A is placed in the next pressing position of the lower die 41.

Next, the procedure proceeds to a separating step S7. The first moving device 52 separates the pair of feed bars 31, 31 (see separation e in FIG. 4). This separates the holders 32, 32 under the hydrogen distribution ports 14*a*, 14*f* of the separator material 12A outward of the separator material 12A.

Next, the procedure proceeds to a retreating step S8. The third moving device 54 causes the pair of feed bars 31, 31 to retreat (see retreat f in FIG. 4). Subsequently, the procedure returns to the molding step S1. The conveyed separator material 12A is molded into a shape of the separator material 12B, and furthermore, a sequence of the steps is performed. Such a sequence of steps is sequentially repeated to the separator materials 12A to 12D. The lastly molded separator material 12E is further conveyed to the next process in order to be incorporated into the single cell 10 after the sequence of steps is completed. At this time, in a state where conveyance pins of another device are inserted into the respective through-holes 16 formed on the separator material 12E, the separator material 12E may be conveyed while the separator material 12E is pulled in the direction in which the conveyance pins mutually separate.

Thus, in this embodiment, in the state where the conveyance pins 33 are inserted in the respective through-holes 16 formed on both sides of each of the separator materials 12A to 12E, the separator materials 12A to 12E are pulled in the direction in which the conveyance pins 33 mutually separate to convey the separator materials 12A to 12E. This ensures conveying each of the separator materials 12A to 12E while each of the separator materials 12A to 12E is held in a stable state with a pair of the conveyance pins 33, 33. Since each of the separator materials 12A to 12E is conveyed by inserting the conveyance pins 33 into the through-holes 16 of the respective separator materials 12A to 12E without interposing each of the separator materials 12A to 12E between, for example, the gripping members, each of the separator materials 12A to 12E does not get an indentation or the like.

Furthermore, the hydrogen distribution ports 14*a*, 14*f* through which the hydrogen gas flows are small compared with the air distribution ports 14*c*, 14*d* through which the air and the like flows and the cooling water distribution ports 14*b*, 14*e* through which the cooling water flows. The reason why the hydrogen distribution ports 14*a*, 14*f* are small compared with the air distribution ports 14*c*, 14*d* is that an atmosphere (air) is used for the air and a hydrogen gas filled in a high pressure tank is used for the hydrogen gas, and therefore, a gas flow rate of the hydrogen gas required to generate an electricity may be less with respect to the atmosphere. The reason why the hydrogen distribution ports 14*a*, 14*f* are small compared with the cooling water distribution ports 14*b*, 14*e* (that is, the cooling water distribution ports 14*b*, 14*e* are large compared with the hydrogen distribution ports 14*a*, 14*f*) is for the cooling water distribution ports 14*b*, 14*e* to more effectively cool down the fuel cell 1 that generates heat.

Accordingly, peripheral areas of the hydrogen distribution ports 14*a*, 14*f* have excess spaces more than the air distribution ports 14*c*, 14*d* and the cooling water distribution ports 14*b*, 14*e*. The excess spaces are for forming the through-holes 16. In this embodiment, these excess spaces are used to form the through-holes 16, and thus, the size of the separator materials 12A to 12E does not have to be larger than before.

Furthermore, as described above, the through-holes 16 are reference holes for assembly when the plurality of single cells 10 are assembled. Accordingly, the reference holes for assembly when the plurality of single cells 10 are assembled can be used as the through-holes 16 for conveying. Therefore, it is not necessary to additionally provide the through-holes for conveying, and thus, the productivity of the separator materials 12A to 12E does not deteriorate.

While the embodiments of the present disclosure have been described in detail above, the present disclosure is not limited thereto, and can be subjected to various kinds of changes in design without departing from the spirit and scope of the present disclosure described in the claims.

DESCRIPTION OF SYMBOLS

1 Fuel cell
10 Single cell
12A to 12E Separator material
16 Through-hole
33 Conveyance pin

What is claimed is:

1. A method for conveying a fuel cell separator material for use in a single cell of a fuel cell, a hydrogen gas and an air being supplied for the fuel cell to generate electricity,
   wherein the separator material has a rectangular shape in a plan view of the separator material, and the separator material has both sides on which a pair of through-holes, through which none of a hydrogen gas, an oxygen gas, or a cooling medium flows and which is smaller than the pair of hydrogen distribution ports, are formed at proximity of a pair of hydrogen distribution ports through which a hydrogen gas flows, and
   wherein the conveyance method comprises, when the separator material is conveyed, inserting a conveyance pin into each of the through-holes formed on the separator material, and in a state where the conveyance pin is inserted in each of the through-holes, conveying the separator material while pulling the separator material in a direction in which the conveyance pins mutually separate.

2. The method for conveying the fuel cell separator material according to claim 1,
   wherein the through-hole is a reference hole for assembly when a plurality of single cells are assembled.

* * * * *